US010413873B2

(12) United States Patent
Ema et al.

(10) Patent No.: US 10,413,873 B2
(45) Date of Patent: Sep. 17, 2019

(54) MIXING APPARATUS FOR MIXING POWDER HAVING LIQUID REPELLENT PROPERTY AND LIQUID

(71) Applicant: NISSHIN ENGINEERING INC., Tokyo (JP)

(72) Inventors: Akihiko Ema, Fujimino (JP); Yusuke Igawa, Fujimino (JP); Kosuke Ando, Urayasu (JP)

(73) Assignee: NISSHIN ENGINEERING INC., Tokyo (JP)

( * ) Notice: Subject to any disclaimer, the term of this patent is extended or adjusted under 35 U.S.C. 154(b) by 201 days.

(21) Appl. No.: 15/350,627

(22) Filed: Nov. 14, 2016

(65) Prior Publication Data

US 2017/0144117 A1 May 25, 2017

(30) Foreign Application Priority Data

Nov. 19, 2015 (JP) ................................ 2015-226620

(51) Int. Cl.
*B01F 3/12* (2006.01)
*B01D 46/02* (2006.01)
(Continued)

(52) U.S. Cl.
CPC ............ *B01F 3/1228* (2013.01); *B01D 46/02* (2013.01); *B01F 3/04056* (2013.01);
(Continued)

(58) Field of Classification Search
CPC .... B01F 3/1228; B01F 3/04056; B01F 5/205; B01F 15/00974; B01F 15/0254; B01F 13/0283; B01F 15/00831; B01D 46/02
(Continued)

(56) References Cited

U.S. PATENT DOCUMENTS

| | | | | | |
|---|---|---|---|---|---|
| 4,390,284 | A * | 6/1983 | Hyde | ..................... B01D 47/06 | 118/303 |
| 7,544,250 | B2 * | 6/2009 | Huttlin | ................ B01F 13/0233 | 118/303 |
| 2003/0202993 | A1 | 10/2003 | Sato et al. | | |
| 2004/0028710 | A1 | 2/2004 | Oka et al. | | |
| 2015/0298076 | A1 * | 10/2015 | Fazekas | ............ G06F 17/30861 | 366/132 |

FOREIGN PATENT DOCUMENTS

| | | | |
|---|---|---|---|
| JP | 2001-158716 | A | 6/2001 |
| JP | 2003-081733 | A | 3/2003 |

(Continued)

OTHER PUBLICATIONS

U.S. Appl. No. 15/350,536, filed Nov. 14, 2016 in the name of Ema et al.

(Continued)

*Primary Examiner* — Marc C Howell
(74) *Attorney, Agent, or Firm* — Oliff PLC

(57) ABSTRACT

A mixing apparatus for mixing powder and liquid, includes: an apparatus main body having an internal space; a cylindrical member arranged in the internal space with one end facing upward and the other end facing downward, the one end and the other end being opened; a powder dispersing portion arranged above the apparatus main body, the powder dispersing portion dispersing the powder into a space of the cylindrical member; a liquid spraying portion arranged in a vicinity of the powder dispersing portion, the liquid spraying portion spraying the liquid into a space of the cylindrical member; a collection portion arranged below the apparatus main body, the collection portion collecting a mixed powder consisting of the powder dispersed by the powder dispersing portion and the liquid sprayed by the liquid spraying portion; a filter arranged around the cylindrical member in the
(Continued)

internal space; and a discharge port discharging air in the internal space through the filter.

4 Claims, 15 Drawing Sheets

(51) Int. Cl.

| | |
|---|---|
| ***B01F 3/04*** | (2006.01) |
| ***B01F 13/02*** | (2006.01) |
| ***B01F 15/00*** | (2006.01) |
| ***B01F 15/02*** | (2006.01) |
| ***B01F 5/20*** | (2006.01) |

(52) U.S. Cl.
CPC .......... *B01F 5/205* (2013.01); *B01F 13/0283* (2013.01); *B01F 15/00831* (2013.01); *B01F 15/00974* (2013.01); *B01F 15/0254* (2013.01)

(58) Field of Classification Search
USPC ........................................................ 366/167.1
See application file for complete search history.

(56) References Cited

FOREIGN PATENT DOCUMENTS

| | | | |
|---|---|---|---|
| JP | 2005-288367 | A | 10/2005 |
| JP | 2012-224556 | A | 11/2012 |
| WO | 2002/056844 | A1 | 7/2002 |

OTHER PUBLICATIONS

Jul. 31, 2018 Office Action issued in Japanese Patent Application No. 2015-226619.

Jan. 25, 2019 Office Action issued in U.S. Appl. No. 15/350,536.

* cited by examiner

FIG. 10

| FEEDER | PUMP | DISPERSE SUPPLY MACHINE SUPPLY | LIQUID ATOMIZING NOZZLE SPRAY | BLOWER |
|---|---|---|---|---|
| SUPPLY RATE [kg/h] | SUPPLY RATE [kg/h] | PRESSURE [MPa] | PRESSURE [MPa] | FLOW RATE [$m^3$/min] |
| 1.5 | 3.6 | 0.1 | 0.65 | 0.7 |

MIXING APPARATUS FOR MIXING POWDER HAVING LIQUID REPELLENT PROPERTY AND LIQUID

CROSS-REFERENCE TO RELATED APPLICATIONS

The disclosure of the following application claiming priority is incorporated by reference herein: Japanese Patent Application No. 2015-226620 filed on Nov. 19, 2015.

TECHNICAL FIELD

The present invention relates to a mixing apparatus for mixing powder and liquid.

BACKGROUND ART

Conventionally, a mixing apparatus for attaching liquid, e.g., water and oil, to powders, e.g., wheat flour, has been known (for example, Patent Literature 1). With this mixing apparatus, powders can collide with droplets in the air with high probability so that the droplets are uniformly attached to the powders.

CITATION LIST

Patent Literature

Patent Literature 1: JP 2005-288367 A

SUMMARY OF INVENTION

Technical Problem

Meanwhile, when powders are attached to droplets with the aforementioned mixing apparatus, there is a problem that the droplets which are not attached to the powders are attached to a bag filter through which a discharge flow discharged from the inside of an apparatus main body passes. Therefore, in some cases, the bag filter is clogged with the droplets, impairing the discharge force of a blower during discharge by way of the bag filter, preventing prolonged continuous operation of the apparatus.

It is an object of the present invention to provide a mixing apparatus which is capable of mixing powder and liquid continuously over long periods of time.

Solution to Problem

A mixing apparatus according to the present invention is a mixing apparatus for mixing powder and liquid, and the mixing apparatus includes: an apparatus main body having an internal space; a cylindrical member arranged in the internal space with one end facing upward and the other end facing downward, the one end and the other end being opened; a powder dispersing portion arranged above the apparatus main body, the powder dispersing portion dispersing the powder into a space of the cylindrical member; a liquid spraying portion arranged in a vicinity of the powder dispersing portion, the liquid spraying portion spraying the liquid into a space of the cylindrical member; a collection portion arranged below the apparatus main body, the collection portion collecting a mixed powder consisting of the powder dispersed by the powder dispersing portion and the liquid sprayed by the liquid spraying portion; a filter arranged around the cylindrical member in the internal space; and a discharge port discharging air in the internal space through the filter.

Furthermore, in the mixing apparatus according to the present invention, the other end of the cylindrical member is positioned between a lower end of the filter and the collection portion.

Furthermore, in the mixing apparatus according to the present invention, the filter is arranged at a position where a ratio X/D of a diameter D of the cylindrical member to a distance X with respect to the cylindrical member is 0.1 or more.

Furthermore, in the mixing apparatus according to the present invention, the cylindrical member is famed of material selected from the group consisting of fabric, metal and plastic.

Advantageous Effects of Invention

With the mixing apparatus of the present invention, powder and liquid are stably and uniformly mixed continuously over long periods of time.

BRIEF DESCRIPTION OF DRAWINGS

FIG. 10 is a diagram indicating conditions of an experiment using an apparatus according to an embodiment;

DESCRIPTION OF EMBODIMENTS

Figure 1:
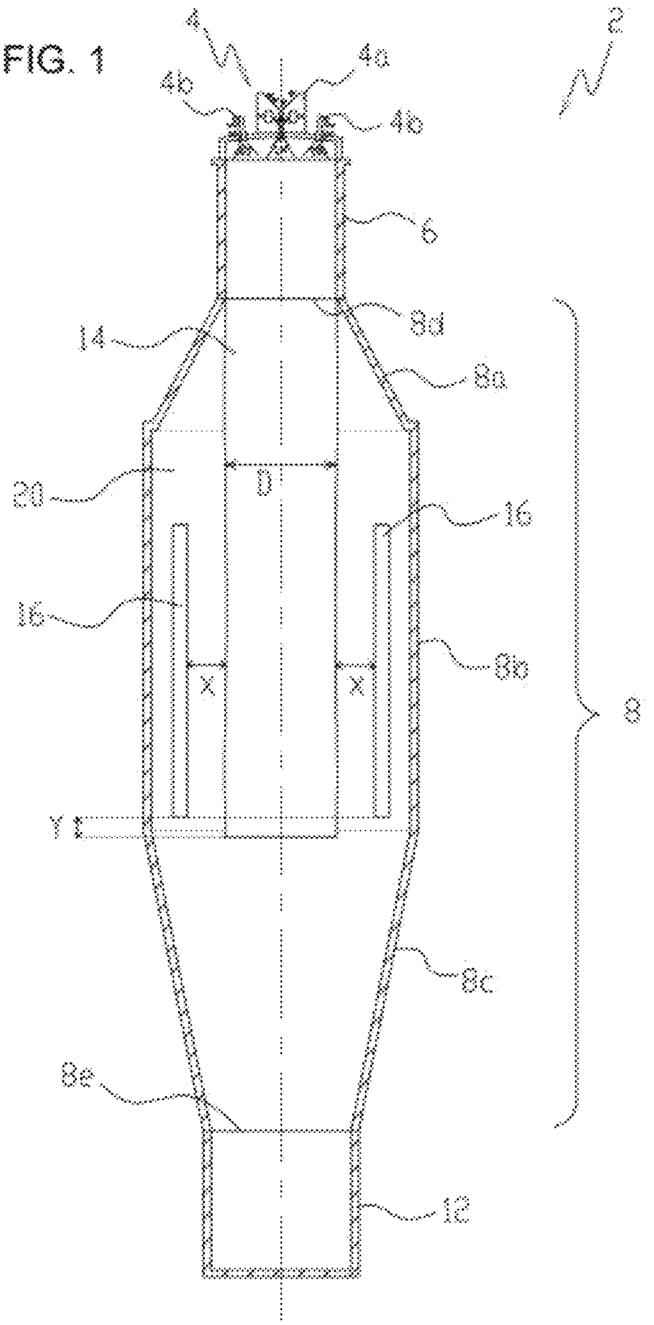
FIG. 1 is a view of an internal structure of an apparatus according to an embodiment, viewed frontally.
Figure 2:
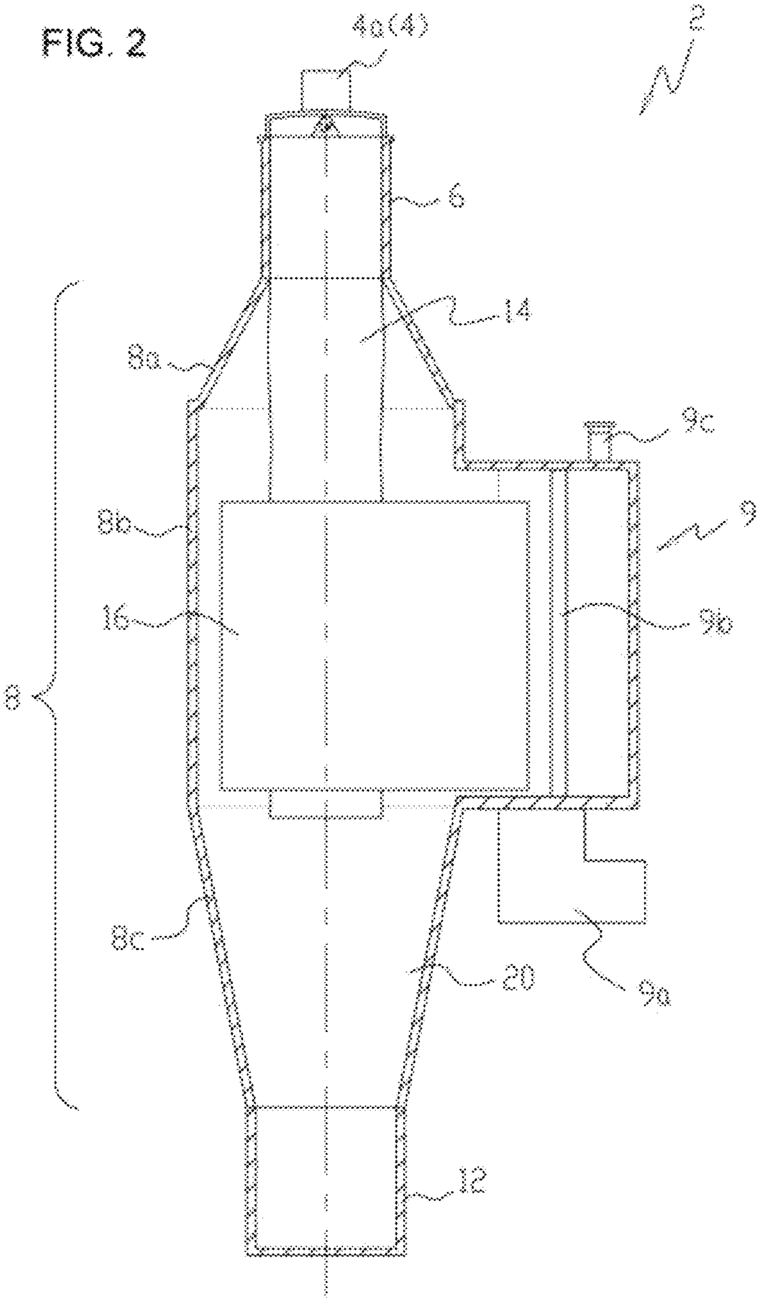
FIG. 2 is a view of an internal structure of an apparatus according to an embodiment, viewed laterally.

In the following, a mixing apparatus according to an embodiment of the present invention is described with reference to the drawings. FIG. 1 is a view of an internal structure of the mixing apparatus, viewed frontally. FIG. 2 is a view of an internal structure of the mixing apparatus, viewed laterally. As illustrated in FIGS. 1 and 2, a mixing apparatus 2 includes an upper lid 4, an introduction pipe 6, an apparatus main body 8, a discharge portion 9, and a collection container 12.

The upper lid 4 is a lid for closing an upper end of the introduction pipe 6. In the upper lid 4, a powder disperser **4*a* for supplying powders in a dispersing manner into the apparatus main body 8 and liquid atomizing nozzles 4*b* for spraying atomized liquid into the apparatus main body 8** are arranged.

The introduction pipe 6 is a cylindrical pipe for introducing the powders supplied from the powder disperser **4*a* and the liquid sprayed from the liquid atomizing nozzles 4*b*, into the apparatus main body 8. The introduction pipe 6 has an outside diameter D of about 300 mm. The introduction pipe 6** has a length $L_6$ of about 300 mm.

The apparatus main body 8 includes three cylindrical shell portions: an upper cylindrical shell portion **8*a* having a truncated square pyramidal shape, an intermediate cylindrical shell portion 8*b* having a rectangular cylindrical shape, and a lower cylindrical shell portion 8*c* having an inverted truncated square pyramidal shape. A top of the upper cylindrical shell portion 8*a* is formed with an opening 8*d* for introducing the powders and the liquid in the introduction pipe 6 into the apparatus main body 8. A lower end of the lower cylindrical shell portion 8*c* is famed with an opening 8*e* for discharging mixed powders to be collected by the collection container 12. As illustrated in the conceptual view of FIG. 3**, a mixed powder C is famed such that powders B are attached to the surfaces of droplets A formed of liquid.

Furthermore, in the apparatus main body 8, a cylindrical member 14 for preventing the droplets A, the powders B, and the mixed powders C from being dispersed into an internal space 20 of the apparatus main body 8, and bag filters 16 through which a discharge flow passes are arranged. The cylindrical member 14 is formed of a non-woven fabric having a bore diameter almost equivalent to that of the introduction pipe 6. The cylindrical member 14 is arranged in the internal space 20 with one end facing upward and the other end facing downward. The one end and the other end are opened to allow the droplets A, the powders B, and the mixed powders C to flow. Furthermore, two bag filters 16 are arranged at positions across the cylindrical member 14 of the internal space 20 where a distance X with respect to the cylindrical member 14 is 100 mm in actual measurement (X/D=0.33). The cylindrical member 14 is arranged so that the one end is connected to the introduction pipe 6 and the other end is positioned between the lower end of the bag filters 16 and the collection container 12. The bag filters 16 are arranged at positions where a distance Y between the lower end of the bag filters 16 and the other end of the cylindrical member 14 is 50 mm in actual measurement. The cylindrical member 14 has a length $L_{14}$ of about 700 mm. However, the length is not limited to the above, but may be selected from a length of $L_{14}/D>1$.

The discharge portion 9 is provided on an outer wall portion of the intermediate cylindrical shell portion **8*b* of the apparatus main body 8. An accumulator 9*a* is arranged on a lower part of the discharge portion 9, and a discharge pipe 9*c* for discharging air in the internal space 20 is arranged on an upper part of the discharge portion 9. Furthermore, inside the discharge portion 9, an air pipe 9*b* for supplying pulsed compressed air, which is introduced from the accumulator 9*a*, to the bag filters 16** is arranged.

The collection container 12 is arranged below the lower cylindrical shell portion **8*c* and collects the mixed powders C mixed in the introduction pipe 6 and the cylindrical member 14**.

Figure 4:
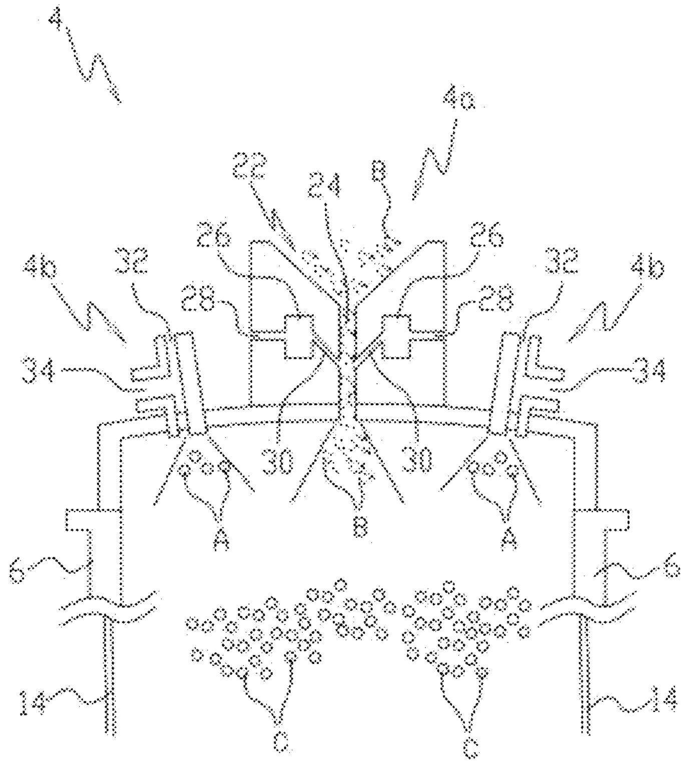
FIG. 4 is a view illustrating an internal structure of an upper lid of an apparatus according to an embodiment.

FIG. 4 is a view illustrating an internal structure of the upper lid 4. As illustrated in FIG. 4, at a roughly central part of the upper lid 4, the powder disperser **4*a*, a device for dispersing the powders into primary particles, is arranged. In the vicinity of the powder disperser 4*a*, two liquid atomizing nozzles 4*b* for generating droplets are arranged across the powder disperser 4*a*. The powder disperser 4*a* and the liquid atomizing nozzles 4*b* are arranged at an angle at which the disperse direction of the powders dispersed from the powder disperser 4*a* and the primary spray direction of the liquid sprayed from the liquid atomizing nozzles 4*b*** make an acute angle with respect to one another so that the powders collide with the liquid with high probability.

An upper part of the powder disperser **4*a* is famed with a powder supply port 22 having an inverted conical shape. At a roughly central part of the interior of the powder disperser 4*a*, a powder passage 24 through which the powder supply port 22 is communicated with the interior of the introduction pipe 6 is formed. Furthermore, inside the powder disperser 4*a*, an air chamber 26, which is an air reservoir for ejecting air at a uniform pressure, an air inlet port 28 for introducing air into the air chamber 26, and a slit 30 through which the air chamber 26 is communicated with the powder passage 24 are famed. The slit 30 is famed in an annular shape around the powder passage 24 and is communicated with the powder passage 24 and the air chamber 26 roughly circumferentially. The air chamber 26 is also famed in an annular shape around the powder passage 24. The air chamber 26 ejects the air introduced from the air inlet port 28 at a uniform pressure across the entire circumference of the slit 30**.

The liquid atomizing nozzle **4*b* is a two-fluid type nozzle including a liquid passage 32 through which the liquid introduced from a liquid supply pipe 53 (see FIG. 8) passes and an air passage 34 for injecting at high speed the compressed air introduced from an air pipe 55 (see FIG. 8) into the liquid passage 32. The liquid atomizing nozzle 4*b*** is not limited to the two-fluid type, but other spray types such as a one-fluid type nozzle using a high-pressure pump and an ultrasonic spray type nozzle may be employed. When oils and fats or the like which are solid at room temperature are used, they are melted by a heater or the like and are transported with a pump.

Figure 5:
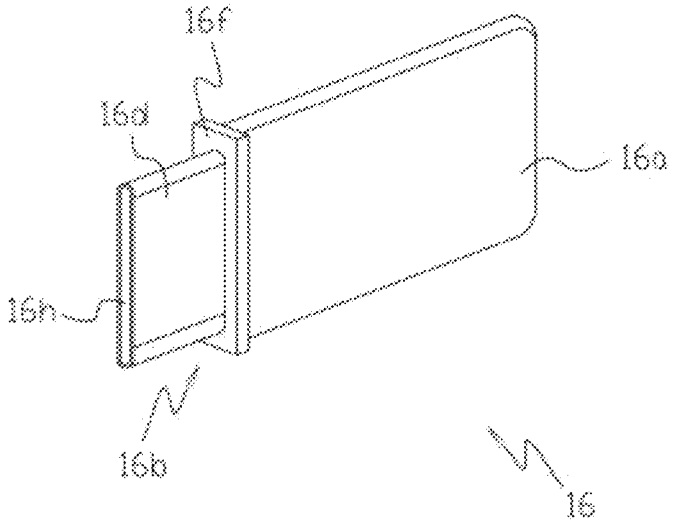
FIG. 5 is a perspective view illustrating an exterior appearance of a bag filter provided in an apparatus main body according to an embodiment.
Figure 6:
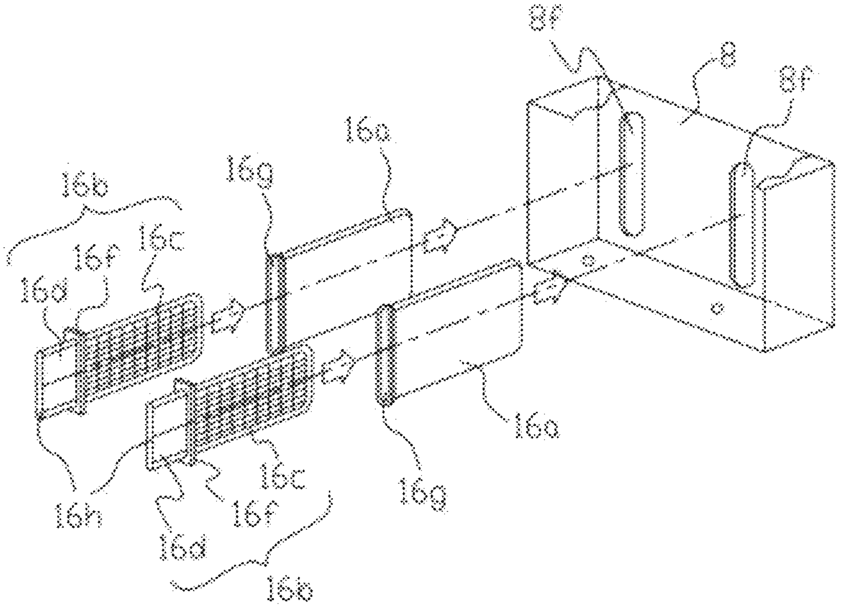
FIG. 6 is an exploded view of a structure of a discharge portion according to an embodiment, viewed from outside an apparatus main body.

FIG. 5 is a perspective view illustrating an exterior appearance of the bag filter 16. FIG. 6 is an exploded view of a structure of the discharge portion 9, viewed from outside the apparatus main body 8. The bag filter 16 is configured such that a main body portion **16*b* is covered with a bag-shaped fabric 16*a*. As illustrated in FIG. 6, the main body portion 16*b* includes a grid-shaped frame 16*c*, a cylindrical portion 16*d* including therein a space 16*h* having a roughly rectangular shape in cross-section, and a fixation portion 16*f* fixed to the apparatus main body 8**.

As illustrated in FIG. 6, the bag filter 16 is mounted on the apparatus main body 8 in such a manner that, the fabric **16*a* is put on the frame 16*c*, the frame 16*c* covered with the fabric 16*a* is inserted into an opening 8*f* famed through the outer wall of the apparatus main body 8, and the fixation portion 16*f* is fixed to the outer wall of the apparatus main body 8. The bag filter 16** is not limited to a quadrangular prism shape, but other shapes such as a cylindrical shape may be employed.

Figure 7:
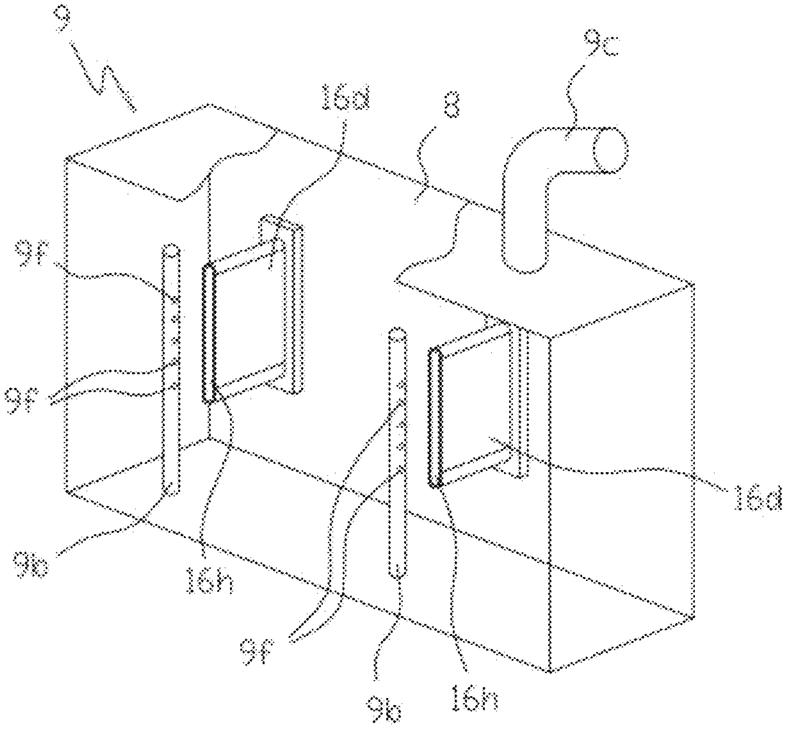
FIG. 7 is a view of a structure of a discharge portion mounted on an apparatus main body according to an embodiment, viewed from above outside an apparatus main body.

FIG. 7 is a view of a structure of the discharge portion 9, viewed from above outside the apparatus main body 8. As illustrated in FIG. 7, a discharge pipe 9*c* is arranged on an upper part of the discharge portion 9, and inside the discharge portion 9, air pipes 9*b* extending upward through the outer wall of a lower part of the discharge portion 9 are arranged. Furthermore, since the bag filters 16 are mounted on the apparatus main body 8 such that the frame 16*c* covered with the fabric 16*a* is inserted into the internal space 20, the cylindrical portion 16*d* of the bag filter 16 is positioned near the outer wall of the apparatus main body 8 inside the discharge portion 9. As a blower 56 (see FIG. 8) is driven, the air in the internal space 20 of the apparatus main body 8 is discharged to the outside via the fabric 16*a*, the space between the fabric 16*a* and the frame 16*c* of the bag filter 16, which is not illustrated, the space 16*h*, the internal space of the discharge portion 9, and the discharge pipe 9*c*.

Furthermore, pulsed compressed air is introduced into the air pipe 9*b* from the accumulator 9*a* at predetermined time intervals. The pulsed compressed air introduced into the air pipe 9*b* is ejected into the space 16*h* through holes 9*f* famed through the air pipe 9*b* and is delivered into the space between the fabric 16*a* and the frame 16*c* via the space 16*h*. Thus, the fabric 16*a* is temporarily expanded and the powders adhered to the fabric 16*a* are removed by the oscillation of the fabric 16*a*. Thus, the air permeability of the fabric 16*a* is maintained. Therefore, clogging of the fabric 16*a* of the bag filter 16 is suppressed during discharge to the outside via the fabric 16*a* of the bag filter 16, the space between the fabric 16*a* and the frame 16*c*, the space 16*h*, the internal space of the discharge portion 9, and the discharge pipe 9*c*, thereby enabling suppression of a reduction in discharge force of the blower 56.

Figure 8:
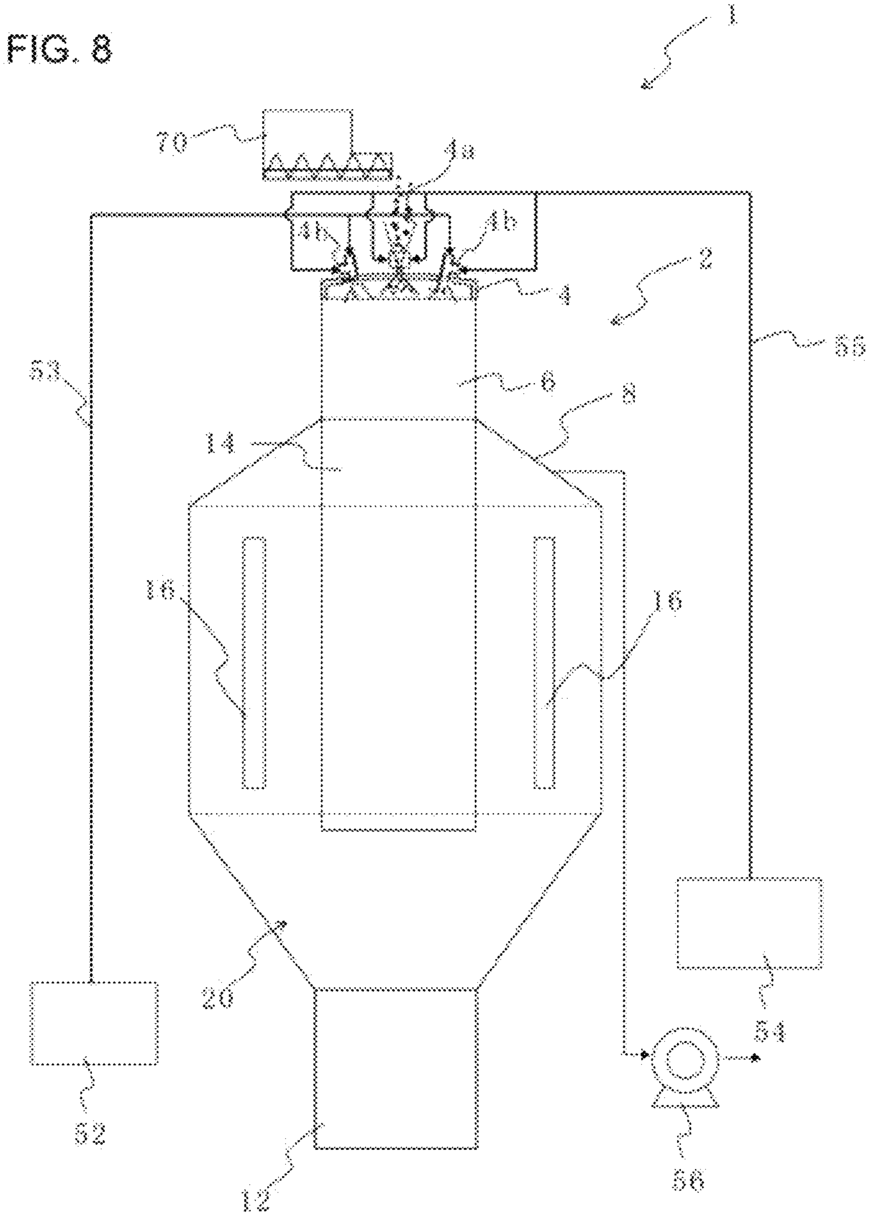
FIG. 8 is a schematic view of a mixing system in which an apparatus according to an embodiment is viewed frontally.
Figure 9:
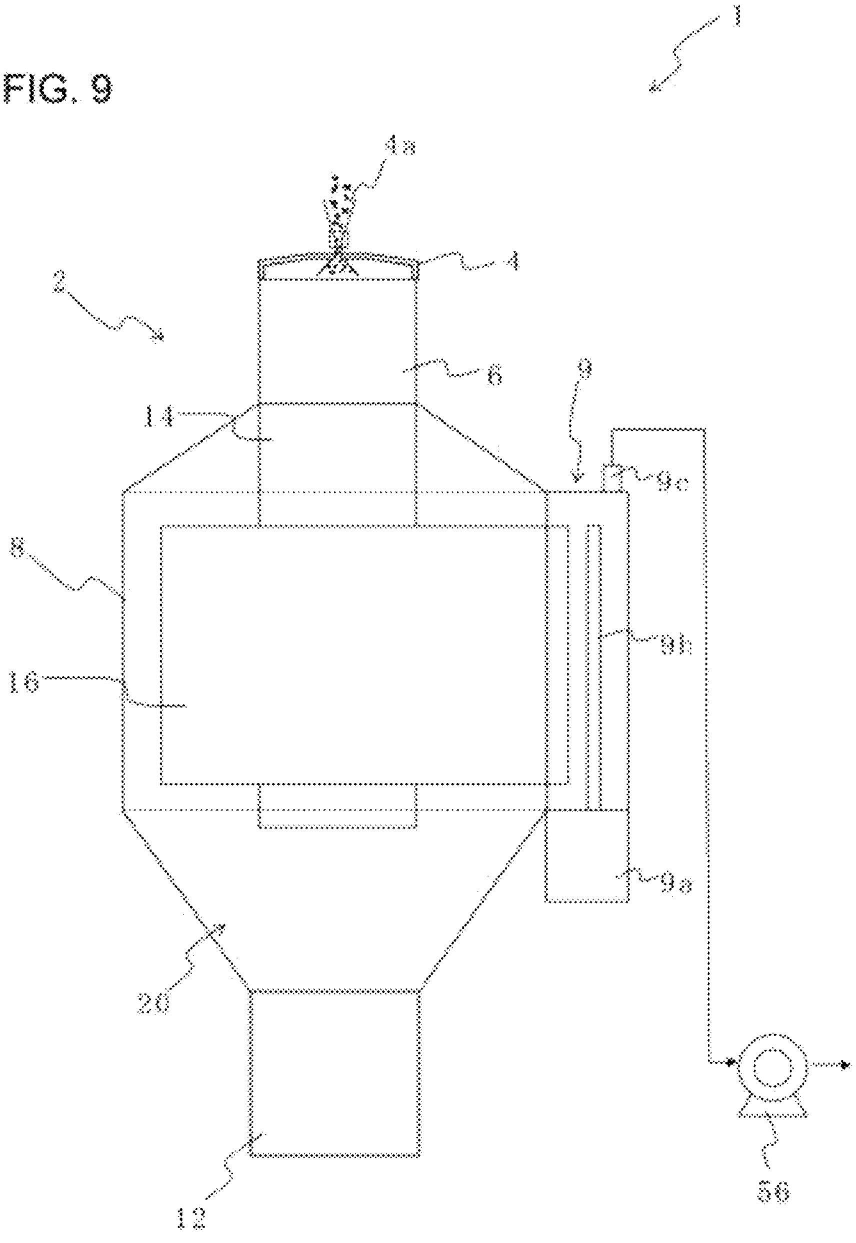
FIG. 9 is a schematic view of a mixing system in which an apparatus according to an embodiment is viewed laterally.

FIG. 8 is a schematic view of a mixing system in which the mixing apparatus 2 is viewed frontally. FIG. 9 is a schematic view of a mixing system in which the mixing apparatus 2 is viewed laterally. For prevention of uneven flow in the cylindrical member 14, it is preferable that the bag filters 16 are arranged axisymmetrically relative to the central axis of the cylindrical member 14 or symmetrically relative to a plane including the central axis of the cylindrical member 14.

Operation Example 1

Figure 11:
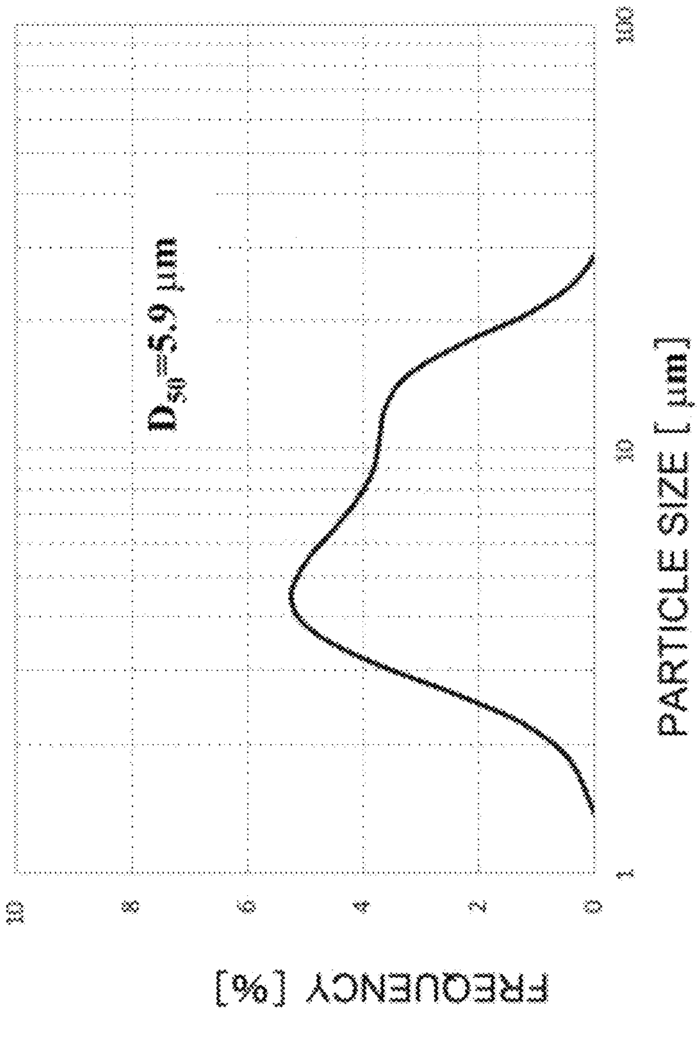
FIG. 11 is a diagram indicating a particle size distribution of magnesium stearate powder used in an experiment using an apparatus according to an embodiment.

A process of generating a mixed powder with the mixing apparatus 2 according to the embodiment is described with reference to the schematic views of the mixing system illustrated in FIGS. 8 and 9. Herein, an example of a case is described where an experiment was conducted under the conditions indicated in FIG. 10 using magnesium stearate powder as powder and water as liquid. Furthermore, as illustrated in FIG. 11, the magnesium stearate powder used in the experiment has a median diameter $D_{50}$ of 5.9 μm.

First, when the operation of a mixing system 1 is started, both a compressed air supply portion 54 and the blower 56 are driven. When the compressed air supply portion 54 is driven, compressed air is introduced into the air passages 34 of the liquid atomizing nozzles 4*b* from the air pipe 55, and compressed air is introduced into the air inlet port 28 of the powder disperser 4*a* from the air pipe 55.

The compressed air introduced into the air inlet port 28 is ejected through the slit 30 at uniform ejection pressure by the air chamber 26 and is discharged into the introduction pipe 6 via the powder passage 24.

Furthermore, when the blower 56 is driven, the air in the internal space 20 of the apparatus main body 8 is discharged to the outside. The air in the internal space 20 passes through the fabric 16*a* put on the bag filter 16 and is then discharged to the outside via the space between the fabric 16*a* and the frame 16*c*, the space 16*h*, the internal space of the discharge portion 9, and the discharge pipe 9*c*. As illustrated in FIG. 10, the blower 56 discharges the air of the internal space 20 at a flow rate of 0.7 $m^3$/min.

Next, when the magnesium stearate powders are supplied to the powder supply port 22 from a feeder 70, as illustrated in FIG. 4, the powders B of magnesium stearate are sucked into the powder passage 24 by a high-speed airstream ejected through the slit 30 and are dispersed into the introduction pipe 6. As illustrated in FIG. 10, the powders B are supplied from the feeder 70 at a supply rate of 1.5 kg/h and are dispersed from the powder disperser 4*a* at an air pressure of 0.1 MPa together with the compressed air.

Next, when a pump 52 is driven, water is supplied from the liquid supply pipe 53 to the liquid passages 32 (see FIG. 4) of the liquid atomizing nozzles 4*b*. As illustrated in FIG. 10, the water is supplied to the liquid supply pipe 53 from the pump 52 at a supply rate of 3.6 kg/h.

The water passing through the liquid passages 32 of the liquid atomizing nozzles 4*b* is atomized by the compressed air injected from the air passages 34 at high speed, and, as illustrated in FIG. 4, is sprayed into the introduction pipe 6 as the droplets A. As illustrated in FIG. 10, the droplets A are sprayed from the liquid atomizing nozzles 4*b* at a pressure of 0.65 MPa. Furthermore, the droplets A have a median diameter $D_{50}$ of about 10 to 30 μm.

The supply rate of the powders supplied from the feeder 70 is 1.5 kg/h and the supply rate of the water supplied from the pump 52 is 3.6 kg/h. Thus, a ratio of the supply rate of the powders to the supply rate of the water is roughly 1:2.

Figure 3:
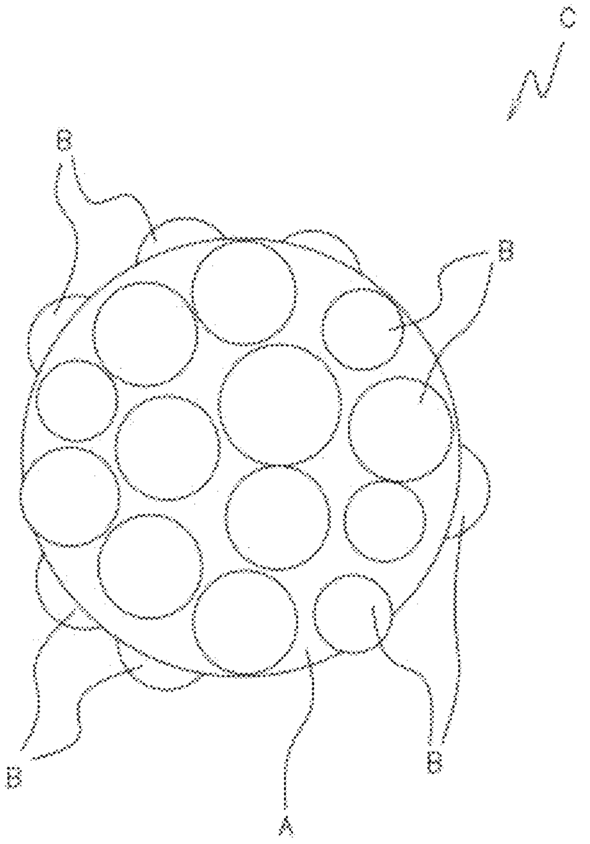
FIG. 3 is a conceptual view illustrating a mixed powder according to an embodiment.

The droplets A sprayed into the introduction pipe 6 from the liquid atomizing nozzles 4*b* and the powders B dispersed into the introduction pipe 6 from the powder disperser 4*a* are mixed in the introduction pipe 6 or in the cylindrical member 14, and the powders B are attached to the surfaces of the droplets A. Since the magnesium stearate powders have a water repellent property, the powders B do not get wet. As illustrated in FIG. 3, the mixed powders C are formed as the powders B are attached to the surfaces of the droplets A. Next, as illustrated in FIG. 4, the mixed powders C fall by their own weight into the introduction pipe 6 and the cylindrical member 14, and are then collected by the collection container 12.

Figure 12:
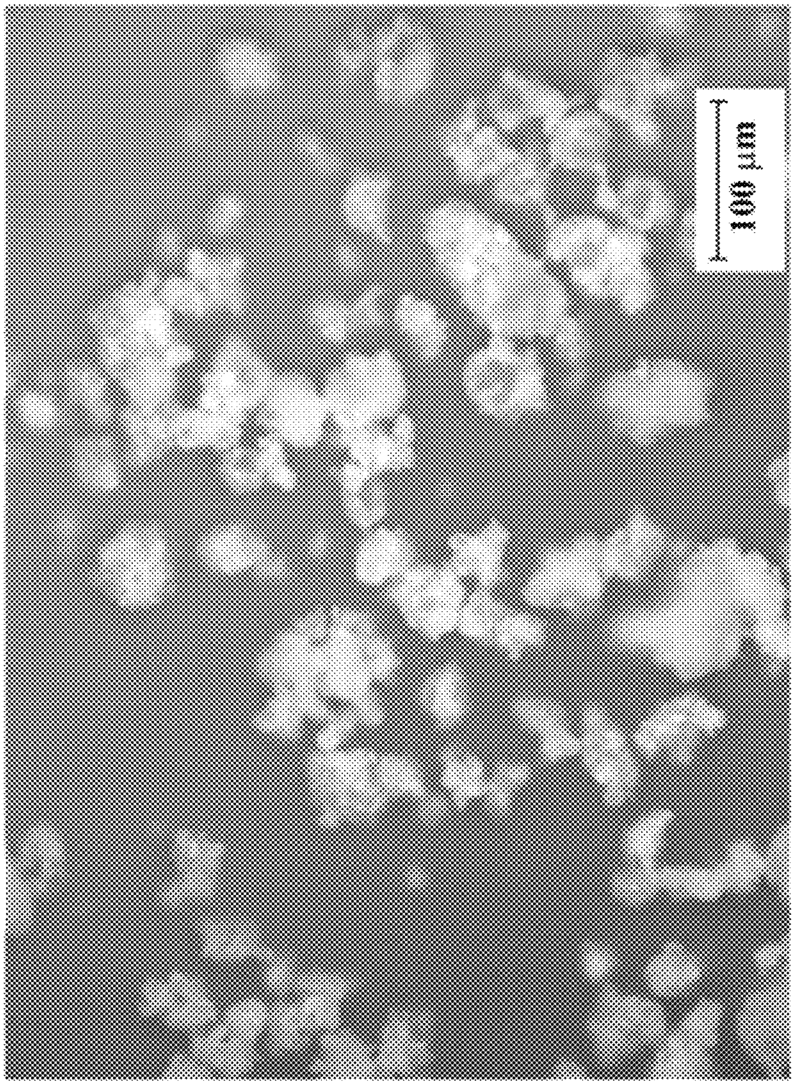
FIG. 12 is a photomicrograph of mixed powders according to an embodiment, photographed at a magnification of 450.
Figure 13:
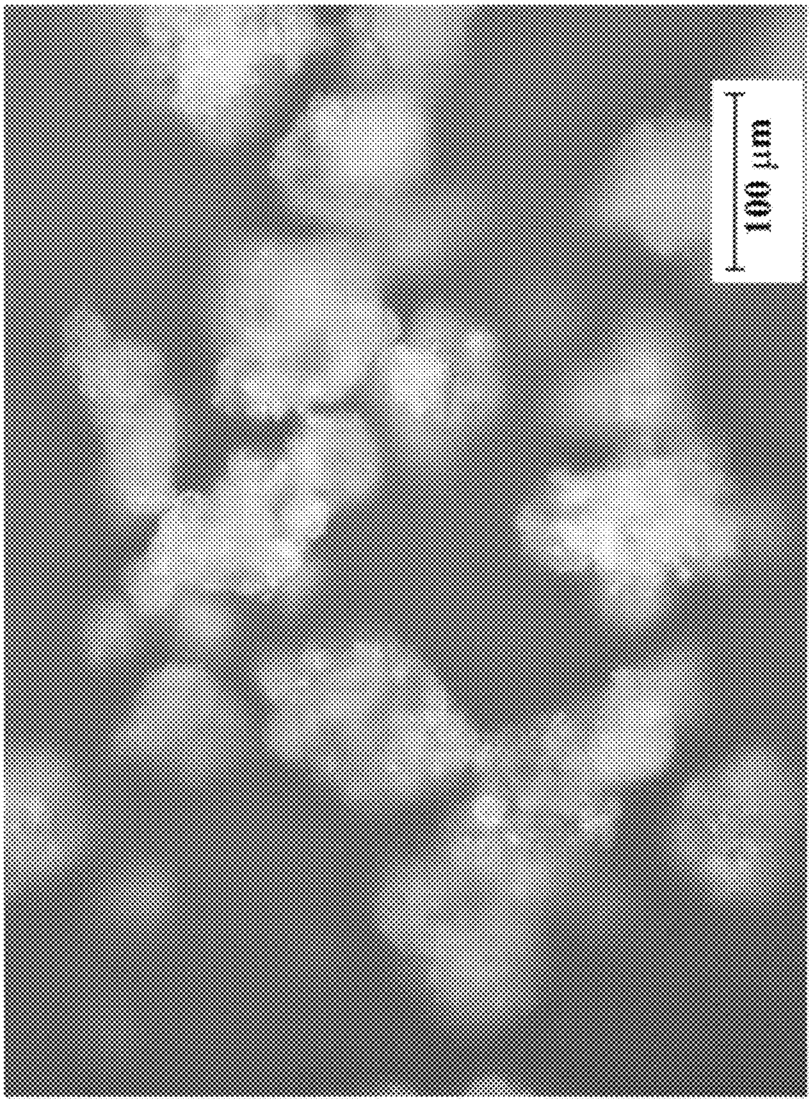
FIG. 13 is a photomicrograph of mixed powders according to an embodiment, photographed at a magnification of 1000.

FIG. 12 is a photomicrograph of the surfaces of the mixed powders C photographed at a magnification of 450. FIG. 13 is a photomicrograph of the surfaces of the mixed powders C photographed at a magnification of 1000. In the photomicrographs, the portions viewed in white are the mixed powders C, and the portions viewed in black are the base. As an experiment is conducted under the conditions indicated in FIG. 10, as illustrated in FIGS. 12 and 13, the mixed powders C in which the powders B are uniformly attached to the surfaces of the droplets A are obtained stably over long periods of time.

Operation Example 2

An operation was conducted with the mixing apparatus 2 of the embodiment at a powder supply rate of 3 kg/h, at a liquid supply rate of 4 kg/h, at a powder dispersion pressure of 0.2 MPa, and at a liquid spray pressure of 0.65 MPa for an hour using a mixture of talc, kaolin, mica or the like as powder and salad oil as liquid. As a result, the pressure drop through the filter was almost stable at about 0.1 kPa, and a mixture of liquid and powder was obtained.

Comparative Example

The cylindrical member 14 was removed and an operation was conducted under the conditions of Operation Example 2 above. As a result, after five minutes from the operation, the pressure drop through the filter was increased suddenly, preventing further operation.

In the mixing apparatus 2 according to the embodiment, the cylindrical member 14 is arranged in the internal space 20 of the apparatus main body 8. Thus, the droplets A are prevented from being dispersed into the internal space 20 and independently attached to the fabric 16*a* put on the bag filter 16, so that the discharge force of the blower 56 can be maintained and the powders B are uniformly attached to the periphery of the droplet A continuously over long periods of time.

Furthermore, the bag filters 16 are arranged at positions where the distance X between the bag filter 16 and the cylindrical member 14 is 100 mm in actual measurement (see FIG. 1) and the distance Y between the lower end of the bag filter 16 and the other end of the cylindrical member 14 is 50 mm in actual measurement. Thus, an uneven flow is not generated in the spaces of the introduction pipe 6 and the cylindrical member 14 by the flow of the discharge portion 9, enabling uniform mixing of the droplets A and the powders B.

In the aforementioned embodiment, an example of a case is described where water is used as liquid. However, both water-based liquid and oil-based liquid can be used. Specifically, examples of oils and fats include vegetable oils and fats such as salad oil, corn oil, sesame oil, rapeseed oil, camellia oil, palm oil, cacao butter, palm oil, and olive oil; animal oils and fats such as lard and butter; and mineral oils and fats such as liquid paraffin, silicon oil, and mineral wax.

Furthermore, an aqueous solution in which a component that provides the mixed powders C with some kind of function is dissolved in water may be used. Furthermore, other liquids may be used. For example, as powders having an oil repellent property are mixed with oil or an oil and fat liquid, mixed powders in which powders are attached to oil droplets can be generated.

Furthermore, the powder is not limited to the magnesium stearate powder, but potato starch, corn starch, rice flour, wheat flour, titanium dioxide, barium sulfate, calcium carbonate, aluminum oxide, silicon oxide, talc, mica, kaolin, nylon, polyester, polystyrene, or the like may be used. A median diameter $D_{50}$ is preferably 50 μm or less, more preferably 20 μm or less.

Furthermore, in the aforementioned embodiment, as illustrated in FIG. 10, an example of an experiment is described in which a ratio of the supply rate of the powders to the supply rate of the water is roughly 1:2 (1.5 kg/h: 3.6 kg/h). However, mixed powders can be generated even at a different supply rate ratio. For example, a ratio of the supply rate of the powders to the supply rate of the water may be roughly 1:1 (3.3 kg/h: 3.6 kg/h).

Furthermore, in the aforementioned embodiment, an example of a case is described in which the cylindrical member 14 is famed of a fabric with air permeability. However, the cylindrical member 14 may be famed of a base material without air permeability such as metal and plastic. In cases where a base material which is not air permeable and does not allow entry of powder or liquid, such as metal and plastic, is used for the cylindrical member 14, when, for example, various types of mixed powder are generated, the cylindrical member 14 can be cleaned to remove the powders attached to the cylindrical member 14. Thus, the cylindrical member 14 can be reused. Furthermore, the cylindrical member 14 may have a liquid repellent property. For example, the cylindrical member 14 itself may be famed of a base material which has a liquid repellent property. The surface of the cylindrical member 14 may be subjected to surface treatment so as to have a liquid repellent property.

Furthermore, in the aforementioned embodiment, an example of a case is described in which the droplet A sprayed through the liquid atomizing nozzles 4*b* has a median diameter $D_{50}$ of 10 to 30 μm. However, the median diameter of the droplet A is not necessarily limited to the above range, but it is sufficient that $D_{50}$ is in a range of 10 to 50 μm. Even when the nozzle pressure of the liquid atomizing nozzles 4*b* is reduced and the droplet A has a median diameter $D_{50}$ of more than 50 μm, the mixed powder C can be generated.

Furthermore, in the aforementioned embodiment, the bag filters 16 do not necessarily have to be arranged at positions where the distance X with respect to the cylindrical member 14 is 100 mm in actual measurement. It is sufficient that the bag filters 16 are arranged at positions where a ratio (X/D) of the diameter D of the cylindrical member 14 to the distance X with respect to the cylindrical member is 0.1 or more.

Furthermore, in the aforementioned embodiment, it is sufficient that the bag filters 16 are arranged at positions where a ratio (Y/D) of the distance Y between the lower end of the bag filter 16 and the other end of the cylindrical member 14 to the diameter D of the cylindrical member is 0 or more. However, the bag filters 16 are preferably arranged at positions where Y/D is 0.1 or more, more preferably arranged at positions where Y/D is 0.3 or more.

The droplet A and the powder B are not identical in particle size or particle density. Therefore, when there is a sudden change of flow, since the droplet A and the powder B are subjected to different inertias forces, the particle trajectories of the droplet A and the powder B differ significantly. When the cylindrical member 14 having a bore diameter almost equivalent to that of the introduction pipe 6 is arranged in the internal space 20 and the ratio with respect to the diameter D of the cylindrical member 14 is set to the above-described condition, an uneven flow is not generated in the spaces of the introduction pipe 6 and the cylindrical member 14 by the discharge of the blower 56. Thus, the powders B are attached to the surfaces of the droplets A in the cylindrical member 14, which is a space smaller than the internal space 20, so that the droplets A collide with the powders B with high probability, enabling efficient generation of the mixed powders C.

Furthermore, in the aforementioned embodiment, an example of a case is described in which the cylindrical member 14 has a cylindrical shape. However, the cylindrical member 14 may not necessarily have a cylindrical shape.

Figure 14:
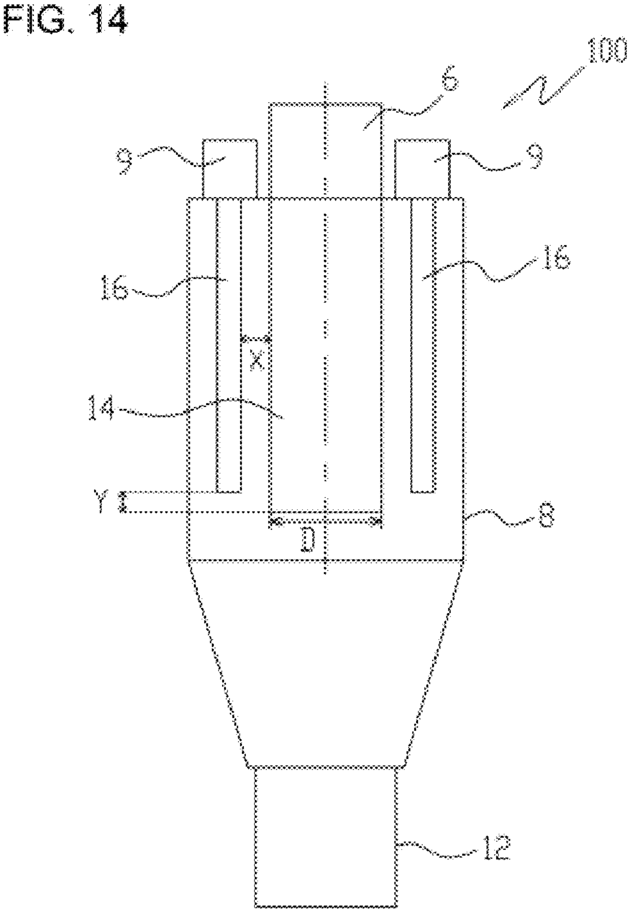
FIG. 14 is a schematic view of an internal structure of a mixing apparatus according to another embodiment, viewed frontally.
Figure 15:
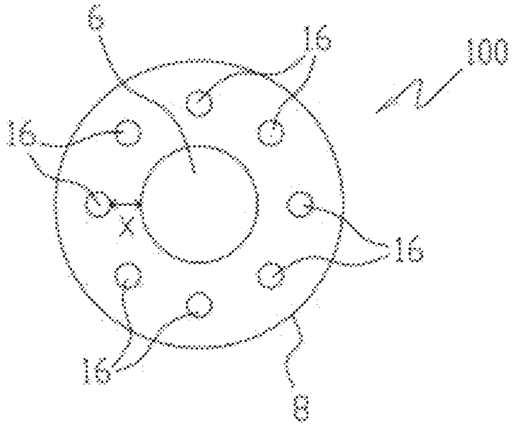
FIG. 15 is a schematic view of an internal structure of a mixing apparatus according to another embodiment, viewed from above.

An apparatus according to another embodiment is illustrated in FIGS. 14 and 15. FIG. 14 is a schematic view of an internal structure of a mixing apparatus according to another embodiment, viewed frontally. FIG. 15 is a schematic view of an internal structure of a mixing apparatus according to another embodiment, viewed from above. The elements of a mixing apparatus 100 according to another embodiment, which are the same as the elements of the mixing apparatus 2, are given the same reference numerals used in the description of the mixing apparatus 2, and the description is omitted.

In the mixing apparatus 100, eight cylindrical bag filters 16 are disposed around the cylindrical member 14 axisymmetrically relative to the central axis of the cylindrical member 14 so that Y/D=0.3 and X/D=0.2. With the mixing apparatus 100 having the above configuration, a uniform mixture of droplets and powders is obtained stably over long periods of time.

With the mixing apparatuses 2, 100 according to the aforementioned embodiments, powder and liquid are roughly uniformly mixed. Therefore, the mixing apparatuses 2, 100 can be used for food products or the like for which many mixing operations are performed. Furthermore, the mixing apparatuses 2, 100 are particularly useful in the field of cosmetics or the like where precise mixing is required.

The embodiments described heretofore are described for the sake of easy understanding of the present invention, but are not described to limit the present invention. Therefore, the elements disclosed in the aforementioned embodiments include every design variation and equivalent falling within the technical scope of the present invention.

The invention claimed is:

1. A mixing apparatus for mixing powder and liquid, the mixing apparatus comprising:

an apparatus main body having an internal space;

a cylindrical member arranged in the internal space with one end facing upward and the other end facing downward, the one end and the other end being opened;

a powder dispersing portion arranged above the apparatus main body, the powder dispersing portion dispersing the powder into a space of the cylindrical member;

a liquid spraying portion arranged in a vicinity of the powder dispersing portion and configured to receive the liquid from a liquid supply source, the liquid spraying portion spraying the liquid into the space of the cylindrical member to a direction making an acute angle to a disperse direction of the powder dispersed from the powder dispersing portion;

a collection portion arranged below the apparatus main body, the collection portion collecting a mixed powder comprising of the powder dispersed by the powder dispersing portion and the liquid sprayed by the liquid spraying portion;

a filter arranged around the cylindrical member in the internal space with a surface of the filter arranged facing a side surface of the cylindrical member and a lower end of the filter located in a vicinity of the other end of the cylindrical member; and a discharge port discharging air in the internal space through the filter.

2. The mixing apparatus according to claim 1, wherein the filter is arranged at a position where a ratio X/D of a diameter D of the cylindrical member to a distance X with respect to the cylindrical member is 0.1 or more.

3. The mixing apparatus according to claim 1, wherein the cylindrical member is formed of material selected from the group consisting of fabric, metal and plastic.

4. The mixing apparatus according to claim 2, wherein the cylindrical member is formed of material selected from the group consisting of fabric, metal and plastic.

* * * * *